United States Patent Office 3,081,222
Patented Mar. 12, 1963

3,081,222
FUNGICIDES
Howard A. Hageman, Southbury, and John A. Riddell, Hamden, Conn., assignors to United States Rubber Company, New York, N.Y., a corporation of New Jersey
No Drawing. Filed Mar. 11, 1960, Ser. No. 14,211
13 Claims. (Cl. 167—33)

This invention relates to new and useful improvements in fungicides. The invention further relates to methods of treating plants that are subject to attack by microorganisms and to methods of treating fungus infected plants.

We have found that 2-aminoimidazolines represented by the following general formula are effective fungicides:

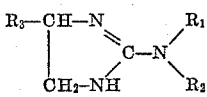

wherein $R_1$ stands for an aromatic or cycloaliphatic radical and $R_2$ stands for hydrogen and $R_3$ stands for hydrogen or methyl, or wherein $R_1$ and $R_2$ each stand for the same alkyl radical having one to four carbon atoms, and $R_3$ stands for hydrogen or methyl. The 2-aminoimidazolines are strong bases which form water soluble salts with acids such as hydrochloric, hydrobromic, sulfuric, nitric, acetic and carbonic acids. They may be used as fungicides in the form of the free base or as such salts. The 2-aminoimidazolines of the present invention are prepared in known manner by treating a 2-alkylthioimidazoline or a salt thereof with an amine which replaces the 2-alkylthio group according to the following reaction:

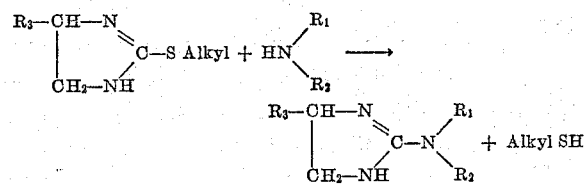

The procedure is essentially that of Kranzlein and Ochwat, U.S. Patent No. 1,912,849 who prepared several 2-aminoimidazolines for use as vulcanization accelerators and dyestuff intermediates.

In the preparation of the present 2-aminoimidazolines, the synthetic procedure consists in heating 2-n-butylthioimidazoline hydrobromide or the 4-alkyl-2-n-butylthioimidazoline hydrobromide with the appropriate primary or secondary amine in a medium of n-amyl alcohol, causing the evolution of butyl mercaptan and the formation of the hydrobromide of the resulting 2-aminoimidazoline. Where desired to liberate the free base, the hydrobromide salt was treated with strong alkali. When these compounds are applied as fungicides, it is immaterial whether they are in the form of the free bases or the salts thereof.

The following illustrates the preparation of the chemicals of the present invention. The particular 2-p-anilinophenylaminoimidazoline formed in a new chemical. The various other 2-aminoimidazolines according to the present invention are prepared in a similar manner.

*Preparation of 2-p-Anilinophenylaminoimidazoline*

In a 500 ml. flask was placed a mixture of 70 g. of p-aminodiphenylamine, 86 g. of 2-n-butylthioimidazoline hydrobromide and 200 ml. of n-amyl alcohol. With a thermometer immersed in this mixture, sufficient heat was applied to effect gentle boiling. Boiling was continued over a period of 4 hours, causing distillation of n-butyl mercaptan and part of the n-amyl alcohol. During this heating period the temperature of the boiling mixture gradually rose from an initial temperature of 130–135° C. to a final temperature of 160–165° C. After allowing the reaction mixture to cool to 85–90° C. it was treated with 200 ml. of isopropanol and then allowed to stand overnight.

The blue-gray, crystalline solid which had precipitated was collected by filtration and the filter cake was washed with several portions of ether. Upon recrystallizing this product from methanol there was obtained the hydrobromide of 2-p-anilinophenylaminoimidazoline was sparking blue-gray needles melting at 212–213° C.

Calculated for $C_{15}H_{17}N_4Br$: Percent N=16.8; Percent Br=24.0. Found: Percent N=16.0; percent Br=22.8.

By treating this hydrobromide with sodium hydroxide in a medium of methanol and then diluting this solution with water, the free base of 2-p-anilinophenylaminoimidazoline is obtained as a light tan powder which melts at 180–182° C.

The chemicals of the present invention may be applied to plants, which term includes various plant parts such as seeds, flowers, fruits, vegetables and foliage, as a liquid or spray in a liquid carrier such as an organic solvent or water, or may be applied as a dust in admixture with a powdered solid carrier such as the various mineral silicates, e.g. mica, talc, pyrophillite, and clays. The chemicals of the invention may be applied in admixture with surface-active agents which may be anionic, non-ionic or cationic surface-active agents, and which act as wetting agents for the chemicals. Such surface-active agents are well known and reference is made to U.S. Patent No. 2,547,724, columns 3 and 4 for detailed examples of the same. The chemicals of the invention may be admixed with powdered solid carriers, such as mineral silicates, together with a surface-active agent so that a wettable powder may be obtained which may be applied directly to plants, or which may be shaken up with water for application to the plants in that form. Such applications of the chemicals may be made to disease-free plants for protective purposes, and also to fungus-infected plants.

The effectiveness of the chemicals of the present invention as fungicides is demonstrated by testing their ability to control the damaging effects of the fungus *Uromyces phaseoli* var. *typica* Arth. on Pinto beans. The disease caused by this fungus is commonly known as bean rust. As will be more fully apparent in the description of the test procedure below, the chemical compounds of the present invention function as systemic fungicides. It is to be emphasized that the number of chemical compounds which exhibit systemic fungicidal activity against bean rust is considerably smaller than those which are active as protective fungicides. There are many distinct advantages of a systemic fungicide over a protective fungicide. A protective fungicide is effective only as long as the chemical is retained by the plant. In practice, this is usually a relatively short period because of its susceptibility to wash off and weathering. Further, the protective fungicide only prevents the spread of certain diseases and cannot usually eradicate the disease if it is already well established. There are many serious diseases such as wilts and soil-borne diseases which, because of their systemic nature or because infection occurs through the root, protective fungicides cannot control. A systemic fungicide, which is absorbed by the plant and translocated to all parts of the plant and is active at all these various sights, overcomes the disadvantages of a protective fungicide. A systemic fungicide does not only have the potential of protecting against any disease for a comparatively long time but may also eradicate any disease organisms established in the plant tissue. Thus a single chemical application will afford a long and continual protection against disease. It is of course essential that the systemic fungicide is not phytotoxic and does not kill the plant. Higher alkyl substituents, i.e. an alkyl substituent having eight or more carbon atoms, in the 2-alkylaminoimidazolines impart a high degree of phytotoxicity to the compounds and hence such compounds are of no use in the present invention.

The following procedure was used to test various chemicals of the present invention as systemic fungicides.

Urediospores or summer spores of *Uromyces phaseoli* var. *typica* Arth. are collected from previously inoculated plants by brushing the spores into a vial. A suspension of 35 mg. of spores in a liter of water is sprayed to run-off on the expanding primary leaves of ten-day old Pinto bean plants. The infected plants are placed in a continual mist humidity chamber at 75° F. for 24 hours, then in the greenhouse for an additional 24 hours. At this time the organisms are established within the plant tissues and are not affected by the usual protective fungicides.

One gram of each of the chemicals to be tested is ground with three ml. of acetone and 50 mg. of a non-ionic surface-active agent (a condensation product of an alkyl phenol and ethylene oxide). The acetone and surface-active agent are known to be inactive in this biological test. The above mixtures are diluted with sufficient water to make solutions containing 2000 parts per million (p.p.m.) of each of the chemicals being tested. Each of these solutions is sprayed to run-off on three of the infected bean plants described above. These plants are held overnight at 70 to 75° F. and 95–100% relative humidity, then allowed to dry in the shade before being placed in the greenhouse. In 8 to 10 days the sori or brown pustules appear on the upper and lower leaf surfaces of untreated plants. The number of pustules on the treated plants is an index of the activity of the chemical being tested. Such data, expressed as percent control, are shown in the following table:

| Chemical— | Percent control |
|---|---|
| 2-anilinoimidazoline (as free base) | 97 |
| 2 - anilino - 4 - methylimidazoline (as hydrobromide) | 98 |
| 2-p-tolylaminoimidazoline (as free base) | 100 |
| 2-m-chloroanilinoimidazoline (as free base) | 100 |
| 2 - p - anilinophenylaminoimidazoline (as free base) | 98 |
| 2-p-anilinophenylaminoimidazoline (as hydrobromide) | 100 |
| 2 - cyclohexylaminoimidazoline (as hydrobromide) | 98 |
| 2-di-n-butylaminoimidazoline (as free base) | 99 |

None of the plants treated with the chemicals in the table above showed any evidence of phytotoxicity. On the other hand the same treatment with 2-n-octylaminoimidazoline killed the plants, showing that higher alkyl substituents render the 2-alkylaminoimidazolines phytotoxic and of no value in the fungicidal treatment of plants.

It is clear that the 2-aminoimidazolines exemplified in the above table are active systemically. These chemicals are absorbed by the plant and transported to the diseased cells. This absorption by and translocation within the plant has been substantiated by tests in which only part of the infected plant is treated with the chemical; control of the disease extends to untreated portions of the plant.

This application is a continuation-in-part of our application Serial No. 813,055, filed May 14, 1959, now abandoned.

Having thus described our invention, what we claim and desire to protect by Letters Patent is:

1. A fungicidal composition comprising a chemical having the general formula

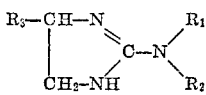

wherein $R_1$ stands for a member selected from the group consisting of phenyl, tolyl, chlorophenyl, anilinophenyl and cyclohexyl radicals when $R_2$ is hydrogen, and $R_1$ stands for an alkyl radical having 1 to 4 carbon atoms when $R_2$ is the same alkyl radical having 1 to 4 carbon atoms as $R_1$, and wherein $R_3$ stands for a member selected from the group consisting of hydrogen and methyl, said composition containing a surface-active wetting agent.

2. A fungicidal composition comprising 2-p-anilinophenylaminoimidazoline and a surface-active wetting agent.

3. A fungicidal composition comprising 2-cyclohexylaminoimidazoline and a surface-active wetting agent.

4. A fungicidal composition comprising 2-di-n-butylaminoimidazoline and a surface-active wetting agent.

5. A fungicidal composition comprising 2-anilinoimidazoline and a surface-active wetting agent.

6. A fungicidal composition comprising a 2-p-tolylaminoimidazoline and a surface-active wetting agent.

7. The method of controlling fungi on plants which comprises applying to plants a chemical having the general formula

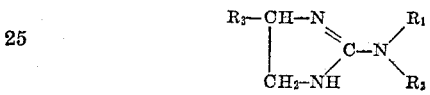

wherein $R_1$ stands for a member selected from the group consisting of phenyl, tolyl, chlorophenyl, anilinophenyl and cyclohexyl radicals when $R_2$ is hydrogen, and $R_1$ stands for an alkyl radical having 1 to 4 carbon atoms when $R_2$ is the same alkyl radical having 1 to 4 carbon atoms as $R_1$, and wherein $R_3$ stands for a member selected from the group consisting of hydrogen and methyl.

8. The method of controlling fungi on plants which comprises applying 2-p-anilinophenylaminoimidazoline to plants.

9. The method of controlling fungi on plants which comprises applying 2-cyclohexylaminoimidazoline to plants.

10. The method of controlling fungi on plants which comprises applying 2-di-n-butylaminoimidazoline to plants.

11. The method of controlling fungi on plants which comprises applying 2-anilinoimidazoline to plants.

12. The method of controlling fungi on plants which comprises applying 2-p-tolylaminoimidazoline to plants.

13. The method which comprises treating fungus infected plants with a chemical having the general formula

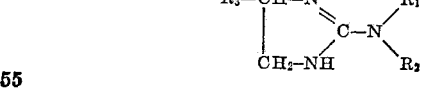

wherein $R_1$ stands for a member selected from the group consisting of phenyl, tolyl, chlorophenyl, anilinophenyl and cyclohexyl radicals when $R_2$ is hydrogen, and $R_1$ stands for an alkyl radical having 1 to 4 carbon atoms when $R_2$ is the same alkyl radical having 1 to 4 carbon atoms as $R_1$, and wherein $R_3$ stands for a member selected from the group consisting of hydrogen and methyl.

References Cited in the file of this patent

UNITED STATES PATENTS

| 1,860,036 | Kranzlein et al. | May 24, 1932 |
| 1,912,849 | Kranzlein et al. | June 6, 1933 |
| 2,213,474 | Puetzer | Sept. 3, 1940 |
| 2,415,047 | Senkus | Jan. 28, 1947 |
| 2,540,170 | Law et al. | Feb. 6, 1951 |
| 2,586,844 | McKay | Feb. 26, 1952 |
| 2,689,249 | Benneville et al. | Sept. 14, 1954 |
| 2,988,478 | Gordon | June 13, 1961 |